United States Patent [19]

Ackerman

[11] Patent Number: 5,336,449
[45] Date of Patent: Aug. 9, 1994

[54] LUMINESCENT COMPOSITIONS AND STRUCTURES INCORPORATING THEM

[75] Inventor: John F. Ackerman, Cheyenne, Wyo.

[73] Assignee: General Electric Company, Schenectady, N.Y.

[21] Appl. No.: 751,847

[22] Filed: Aug. 29, 1991

[51] Int. Cl.$^5$ .................. F21V 9/00; C09K 11/08; C01B 7/00
[52] U.S. Cl. .................. 252/582; 252/301.4 H; 252/588; 423/462
[58] Field of Search ........ 423/462; 252/582, 301.4 H, 252/587, 588

[56] References Cited

PUBLICATIONS

Srivastava et al., Chemical Abstracts, 115:63285k, (1991).
Hua et al., Journal of Non-Crystalline Solids, 107, pp. 219–224, (1989).
Srivastava et al., Mat. Res. Bull., vol. 26, pp. 443–448, 1991.

*Primary Examiner*—Philip Tucker
*Attorney, Agent, or Firm*—William H. Pittman

[57] ABSTRACT

Phosphorescent compounds of the formula $M_2AOF_5$, wherein M is potassium, rubidium or cesium and A is tantalum or niobium, are prepared by the reaction of the appropriate alkali metal fluoride with niobium or tantalum pentoxide in aqueous hydrofluoric acid solution. They have no electrons in the d orbitals of the ground state, and therefore are useful in applications requiring phosphors with short primary decay times.

8 Claims, No Drawings

LUMINESCENT COMPOSITIONS AND STRUCTURES INCORPORATING THEM

This invention relates to new luminescent compositions of matter, useful as phosphors.

Phosphors are employed in such diverse applications as fluorescent lamps, X-ray detection devices including computerized tomography scanners, digital radiography devices and position emission tomography apparatus. Upon excitation by ultraviolet, X-ray or cathode radiation, they release energy in the form of light which may be easily detected.

For many areas of phosphor utilization including medical imaging systems, it is desired to have materials with short primary decay times. One way of reducing decay time is to formulate phosphors having no electrons in the d orbitals of the ground state. Various materials having this property are known. However, there is a continuing search for new phosphor materials with potential for utilization in systems of this type. A number of phosphors satisfying these criteria are provided by the present invention.

In one of its aspects, the invention includes crystalline compounds having the formula $M_2AOF_5$, wherein M is potassium, rubidium or cesium and A is tantalum or niobium, said compounds having a hexagonal crystal lattice of the $Cs_2ZrF_6$ type.

As will be apparent from the above generic formula, the compounds of this invention are oxyfluorides of niobium and tantalum in which the alkali metal ion is potassium, rubidium or cesium. Such compounds may be prepared by the reaction of the appropriate alkali metal fluoride with niobium or tantalum pentoxide in aqueous hydrofluoric acid solution.

An important structural aspect of the compounds of this invention is their existence in hexagonal crystalline form, of the type known to exist, for example, in $Cs_2ZrF_6$. The lattice constants for these compounds are illustrated by those of $Cs_2NbOF_5$, in which $a_0$ and $c_0$ have values of 6.309 and 5.020 Angstroms, respectively. Said compound also has a unique X-ray diffraction pattern, detailed hereinafter, which is characteristic of compounds of this crystal structure.

A compound of the formula $Cs_2NbOF_5$ has been reported in the Powder Diffraction file of the Joint Committee on Powder Diffraction Standards (Card No. 20-281). It has an entirely different diffraction pattern, characteristic of a much more complex crystal structure, than the compound of this invention having the same formula. Moreover, all attempts by the present inventor to prepare said compound have failed. Attempts involving temperatures below 500° C. have resulted in the formation of the compound of the present invention, and above 500° C. there is a reversible transformation to another, yet unidentified structure.

The preparation of the compounds of this invention is illustrated by the following examples.

EXAMPLE 1

A mixture of 2 moles of cesium fluoride and 0.5 mole of niobium pentoxide was heated to 80°–90° C. There was added 500 ml. of a 25% (by weight) aqueous hydrofluoric acid solution, and the mixture was evaporated to dryness. This operation was repeated two more times. The product was a white luminescent solid having the formula $Cs_2NbOF_5$ and having the following X-ray diffraction pattern.

| d(±0.0005) | I(±0.1) | hkl | d(±0.0005) | I(±0.1) | hkl |
|---|---|---|---|---|---|
| 5.4054 | 1.8 | 100 | 1.5779 | 4.5 | 220 |
| 4.9711 | 5.7 | 001 | 1.4787 | 14.7 | 113 |
| 3.6776 | 100.0 | 101 | 1.4518 | 7.7 | 311 |
| 3.1426 | 21.2 | 110 | 1.4280 | 4.5 | 203 |
| 2.7227 | 13.2 | 200 | 1.3673 | 1.3 | 400 |
| 2.5019 | 71.3 | 002 | 1.3195 | 7.9 | 401 |
| 2.3950 | 59.4 | 201 | 1.2984 | 6.4 | 312 |
| 2.2760 | 49.3 | 102 | 1.2564 | 5.5 | 004 |
| 2.0642 | 0.6 | 120 | 1.2338 | 7.0 | 303 |
| 1.9630 | 1.7 | 112 | 1.2249 | 14.1 | 104 |
| 1.9086 | 16.1 | 211 | 1.2178 | 5.0 | 321 |
| 1.8481 | 19.1 | 202 | 1.2018 | 4.0 | 402 |
| 1.8206 | 45.8 | 300 | 1.1939 | 4.5 | 410 |
| 1.7114 | 0.8 | 301 | 1.1494 | 2.2 | 223 |
| 1.6726 | 35.7 | 003 | 1.1422 | 2.6 | 204 |
| 1.5953 | 17.6 | 212 | 1.1235 | 1.9 | 313 |

EXAMPLE 2

The procedure of Example 1 was repeated, substituting tantalum pentoxide on an equimolar basis for the niobium pentoxide. A similar luminescent compound of the formula $Cs_2TaOF_5$ and identical crystalline structure was obtained.

EXAMPLE 3

The procedure of Example 1 was repeated, substituting rubidium fluoride on an equimolar basis for the cesium fluoride. A similar luminescent compound of the formula $Rb_2NbOF_5$ and identical crystalline structure was obtained.

EXAMPLE 4

The procedure of Example 1 was repeated, substituting potassium fluoride on an equimolar basis for the cesium fluoride. A similar luminescent compound of the formula $K_2NbOF_5$ and identical crystalline structure was obtained.

The compounds of this invention, being luminescent, are useful as phosphors in numerous types of lighting structures, medical diagnostic structures and the like, including those enumerated hereinabove. Accordingly, another aspect of the present invention is a phosphorescent article comprising a compound of this invention deposited on a substantially chemically inert support. Said support may be, for example, a material which is also inert to radiation (i.e., a glass envelope in the case of a fluorescent lamp fixture). In the case of a medical imaging apparatus, it may be a light sensing unit such as a photodiode, photomultiplier device or charge-coupled device.

What is claimed is:

1. A phosphorescent article comprising a luminescent compound having the formula $M_2AOF_5$, wherein:
   (a) M is potassium, rubidium or cesium;
   (b) A is tantalum or niobium;
   (c) said luminescent compound has a crystal lattice of the $Cs_2ZrF_6$ type; and
   (d) said phosphorescent article is deposited on a glass envelope support.

2. An article according to claim 1 wherein M is cesium.

3. The article according to claim 2 wherein A is niobium.

4. The article according to claim 2 wherein A is tantalum.

5. An article according to claim 1 wherein M is rubidium.

6. The article according to claim 5 wherein A is niobium.

7. An article according to claim 1 wherein M is potassium.

8. The article according to claim 7 wherein A is niobium.

* * * * *